June 26, 1962  P. D. BOLTON  3,040,674
AIRCRAFT POSITIONING AND LOCATING SYSTEM
Filed Oct. 28, 1957  5 Sheets-Sheet 1
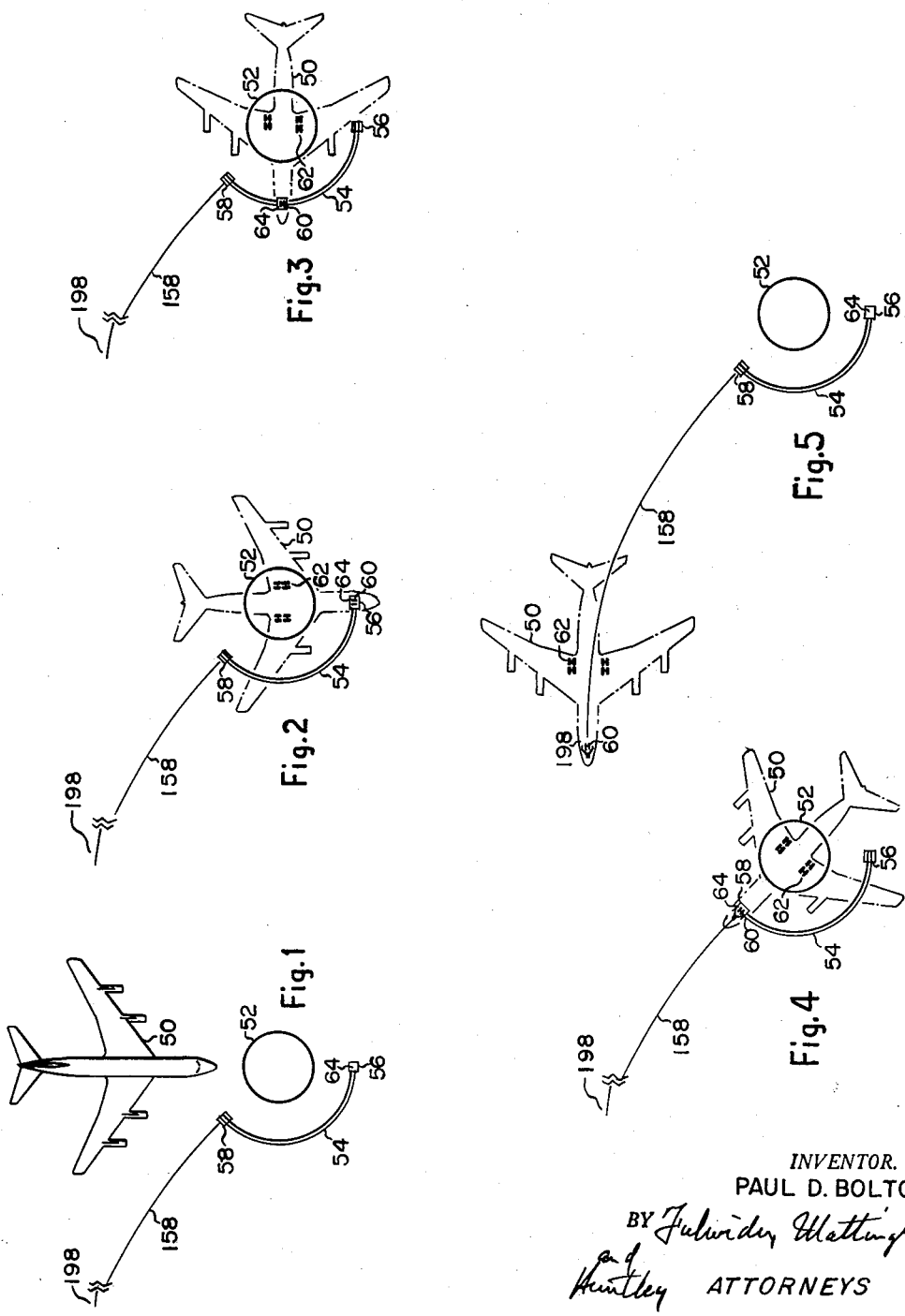
INVENTOR.
PAUL D. BOLTON
BY Fulwider Mattingly
and Huntley ATTORNEYS June 26, 1962  P. D. BOLTON  3,040,674
AIRCRAFT POSITIONING AND LOCATING SYSTEM
Filed Oct. 28, 1957  5 Sheets-Sheet 2

INVENTOR.
PAUL D. BOLTON
BY
ATTORNEYS

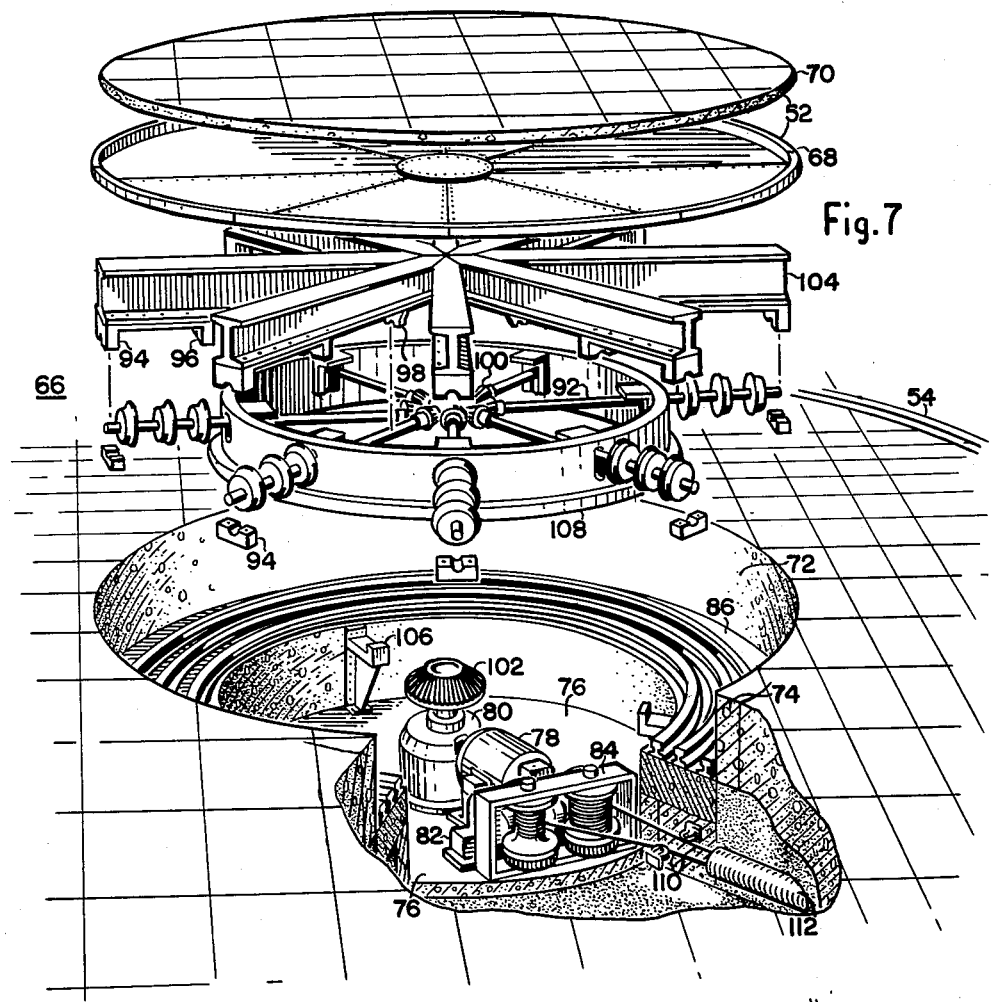

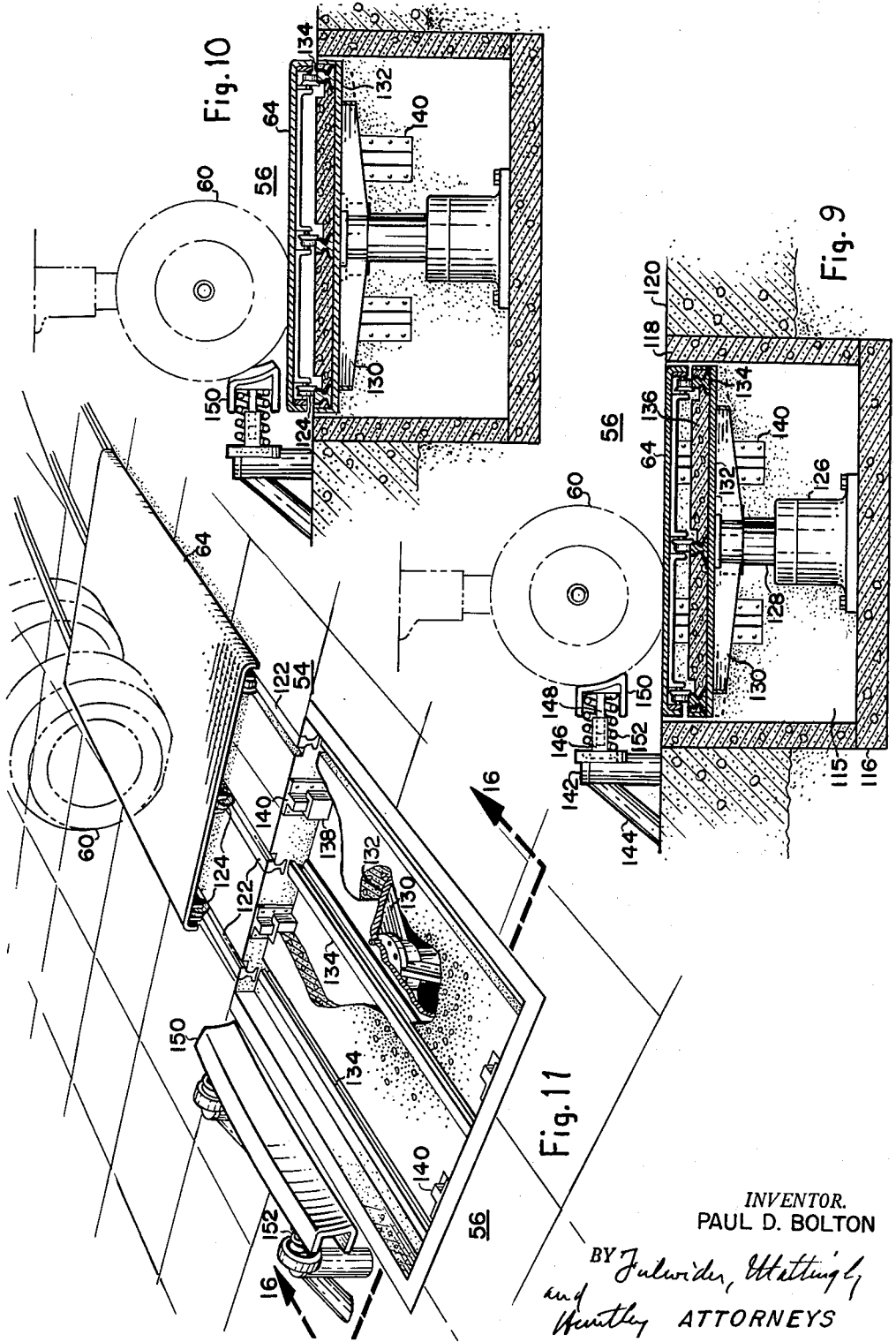

June 26, 1962 P. D. BOLTON 3,040,674
AIRCRAFT POSITIONING AND LOCATING SYSTEM
Filed Oct. 28, 1957 5 Sheets-Sheet 5
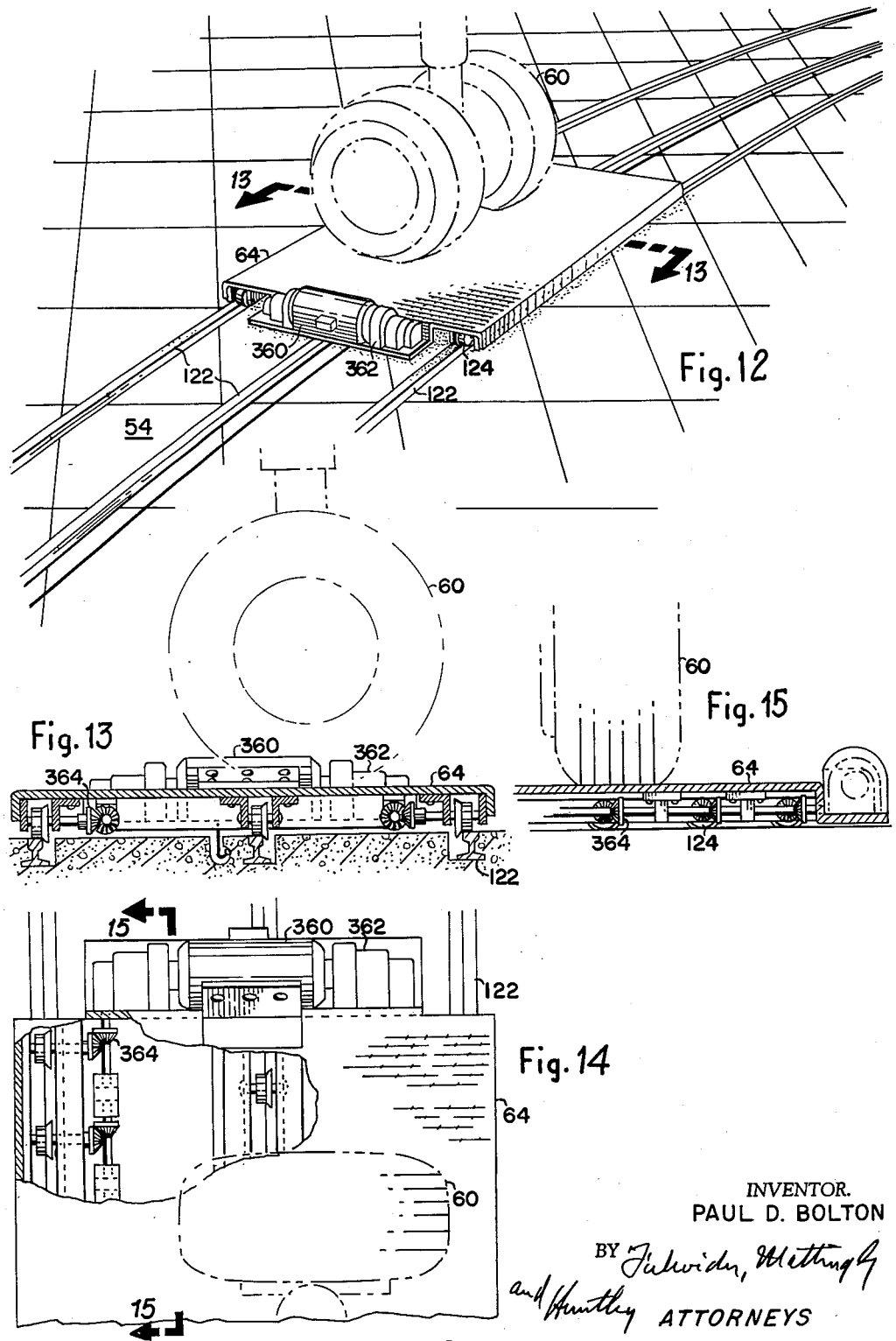
INVENTOR.
PAUL D. BOLTON United States Patent Office 3,040,674
Patented June 26, 1962

3,040,674
AIRCRAFT POSITIONING AND LOCATING
SYSTEM
Paul D. Bolton, 3862 Martha St., San Diego 17, Calif.
Filed Oct. 28, 1957, Ser. No. 692,910
7 Claims. (Cl. 104—44)

The present invention relates to mechanism for positioning and locating large objects such as aircraft while such aircraft is on the surface of the earth.

One of the broad aspects of the present invention is to provide a turntable which receives part of, for example, the main landing gear of aircraft, and in addition to this turntable, the mechanism includes a vehicle which is movable concentrically of the turntable and receives another part of the object such as the nose gear mechanism at the front of the aircraft.

More specifically the invention contemplates mechanism for bodily turning an object such as an airplane about a vertical axis, the mechanism comprising a turntable for supporting part of the weight of the object and includes a track arranged concentrically about the turntable; this track receives and guides a vehicle.

In one aspect of the present invention, mechanism is provided for turning the turntable directly only while permitting the vehicle to be dragged along by the object being turned. In another aspect of the invention, separate means are provided for rotating the turntable and for moving the vehicle on the track; in this latter embodiment the means for driving the turntable and for moving the vehicle operates at the same r.p.m.

More specifically, in addition to the turntable, the mechanism includes a circularly disposed track arranged concentrically of the axis of the turntable. The track includes a section which may be raised and lowered. For this purpose pits are disposed below sections of the track, and the pits include mechanism for lifting or lowering the movable track section. A vehicle, including a platform, is adapted to receive part of the object to be turned such as the nose gear of an airplane. In operation the platform of the vehicle is lowered to ground level whereby objects may readily pass horizontally over the ground. However, when it is desirable to utilize the mechanism for turning an object, after, for example, the nose gear of an aircraft is placed in position on the platform, the track and platform are raised so that the movable section of the track is brought into horizontal alignment with the stationary portions of the track. Mechanism such as a hydraulic jack may be employed for raising and lowering the track with the platform and other objects thereon.

Further objects and advantages will be apparent from the following description, reference being had to the accompanying drawings wherein a preferred embodiment of the invention is illustrated.

In the drawings:

FIG. 1 is a top plan view of the improved mechanism for turning an object, the object being shown as an airplane approaching the mechanism;

FIG. 2 is a view similar to FIG. 1 but showing the airplane in the position it first assumes when it is to be turned;

FIG. 3 is a view similar to FIG. 2 showing the airplane partly turned;

FIG. 4 is a view similar to FIGS. 2 and 3 but showing the airplane at the angle at which it is desired that it be turned;

FIG. 5 is a view similar to FIG. 1 but showing the direction in which it is moved from the position shown in FIG. 4;

FIG. 7 is a perspective view of the turntable pit, part thereof being shown in section to show the machinery therein and the track, the view also showing the upper part of the turntable in exploded position;

FIG. 8 is a sectional view of the pit and the mechanism therein and also a sectional view of the pit for the track elevator;

FIG. 9 is a cross-sectional view of the track system at the pit, containing the elevating mechanism for the vertically movable track section and showing the track section and the vehicle including the platform carried thereby, the platform being at ground level;

FIG. 10 is a view similar to FIG. 9 but showing the vertically movable track section raised to its alignment with the other portions of the tracks;

FIG. 11 is a perspective view showing the vehicle on the stationary track section and showing the track pit with the vertical movable track section therein lowered;

FIG. 12 is a perspective view of a vehicle on a track, the vehicle being self-propelled by an independent motor;

FIG. 13 is a sectional view of the vehicle and track, the section being taken on line 13—13 of FIG. 12;

FIG. 14 is a top plan view of the mechanism shown in FIGS. 12 and 13, part thereof being broken away to show parts of the driving mechanism;

FIG. 15 is a fragmentary sectional view taken along line 15—15 of FIG. 14, and turned 90 degrees.

Figure 6:
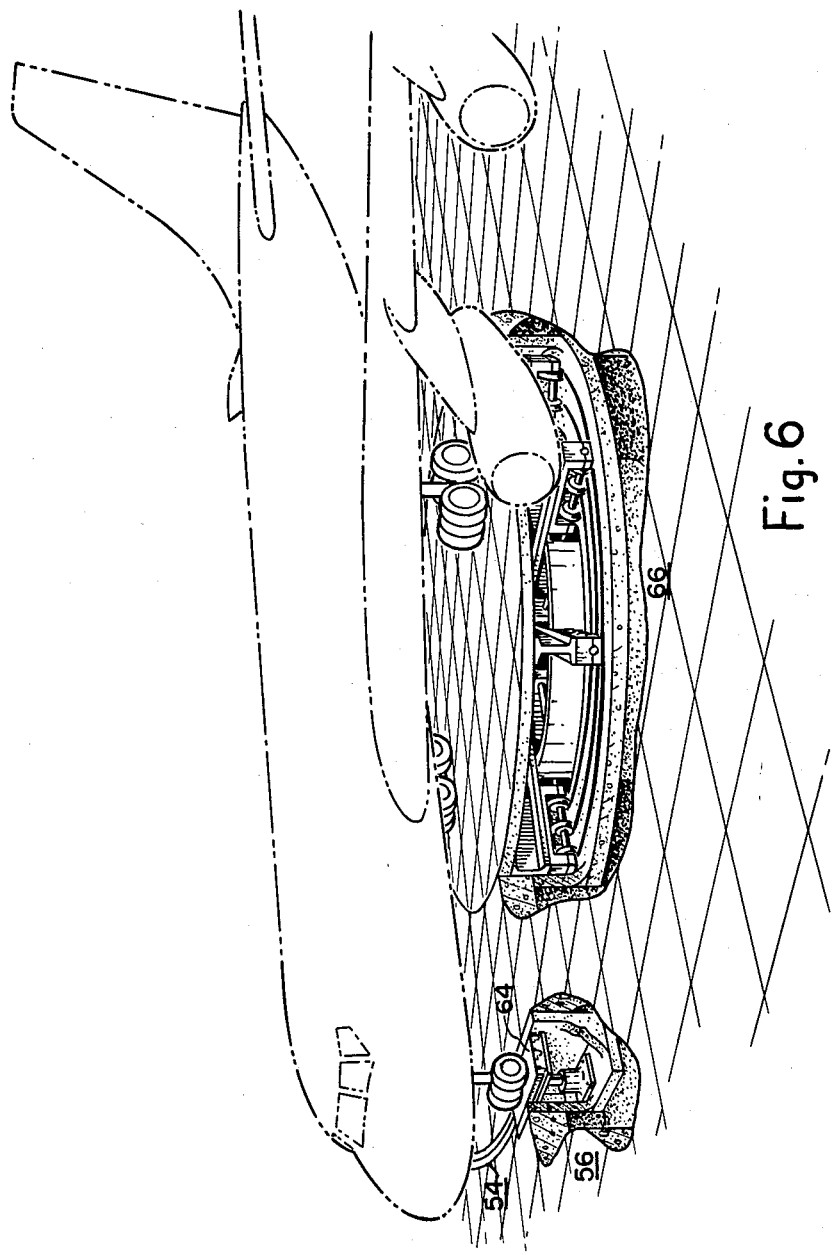
FIG. 6 is a perspective view partly in section showing the turntable and the track, and also showing, in dot and dash lines, the position of the airplane on the turntable and track.

Referring more in detail to the drawings and particularly to FIGS. 1 to 5, the object to be turned is indicated as an aircraft 50 in the form of an airplane. The turntable platform is shown at 52 and the concentric track at 54. This track may comprise a substantially complete circle if desired, but is merely shown here as part of a circle. Obviously there may be several terminals in the track, but for the purpose of simplicity and illustrating the invention, only two are shown, namely the starting terminal 56 and the stopping terminal 58. The airplane in FIG. 1 is shown as approaching from a northerly direction, and in this embodiment it is being self-propelled. The airplane continues southwardly until wheels 60 of the forward or nose landing gear is brought to a halt by a bumper at the starting terminal 56; at this time the wheels 62 of the main landing gear are resting upon the turntable platform 52. A vehicle 64 in the form of a dolly rests at ground surface level at the station 56 and receives the wheels 60.

Turning movement is imparted to the airplane 50 about a vertical axis either by turning the platform 52 or pulling the dolly 64 along the track 54, or by mechanism for doing both; that is, directly imparting clockwise rotation to the platform 52 and directly pulling the vehicle 64 along the track 54. Such turning movement is shown as taking place in FIG. 3. In FIG. 4 the airplane is shown at one of its terminal positions wherein it is headed in a northwesterly direction, and from which it is to be towed to a position on the field at which its engines are started, and FIG. 5 illustrates such position wherein the airplane 50 has been towed a considerable distance from the turning mechanism and is headed in a westerly direction. In FIG. 5 the vehicle 64 has been returned to its starting position.

The turntable 66 is clearly illustrated in FIGS. 7 and 8 where it is shown as carrying the turntable platform 52 which includes the steel circular plate 68 which is cup-shaped and filled with concrete or road material 70. The turntable is disposed within a pit 72. This pit is preferably lined with concrete 74 which concrete therefore constitutes the pit. The pit 72 is provided with a lower deck 76 which supports an electric motor 78, transmission mechanism 80, transmission mechanism 82, and a winch 84. The pit also includes a ring shaped intermediate deck 86 surrounding the deck 76. The deck 86 carries a track, herein comprising three rails 88 which are circularly arranged. Wheels 90 ride upon the rails 88 and are fixed to radially extending shafts or axles 92. These axles are journaled in bearings 94, 96 and 98. The inner ends of the axles 92 have beveled gears 100 secured thereto and are herein referred to as planetary gears which are driven by a sun gear 102. Sun gear 102 in turn is driven by the motor 78 through the gear reduction transmission 80. The bearings 94, 96 and 98 are in the form of struts which carry I-beams 104, and these I-beams in turn carry the platform plate 68. Stationary guides 106 are secured in the bottom part of the pit and cooperate with guides 108, carried by the I-beams 104 to assist the wheels 90 in guiding the turntable. Obviously as the motor 78 is rotated the wheels 90 are rotated through the gear train to carry with them the platform of the turntable.

The winch 84 is shown as connected with a cable 110, the cable passing through an underground tube 112 which tube terminate at a station pit 114. This winch is used for towing the aircraft to and from the platform 52.

Now referring more particularly to FIGS. 9, 10 and 11, it will be seen that a pit 115 is provided with a concrete bottom 116 and lined with concrete wall 118. The upper edge of this wall terminates at ground level indicated at 120. This pit 115 is located at starting terminal 56. It is aligned with the track 54 herein constituting three rails 122 which carry the vehicle 64. This vehicle is provided with rollers 124 therebelow. The bottom of the pit carries an elevator in the form of a hydraulic hoist 126 having a ram 128 which through reinforcing beams 130 carries a platform plate 132. This plate 132 includes a track section including three rails 134. These rails are arranged to be aligned with the main rails 122. Concrete or road material 136 forming a platform is carried by the plate 132 between the rails 134.

FIG. 9 shows the position of the vehicle 64 wherein the platform 132 is in its lowest position, and the vehicle 64 is thus flush with the ground surface 120 for receiving the wheels 60 of the nose gear. FIG. 10 shows the position of the elevator and platform 132 when the rail sections 134 are aligned with the rails 122 whereby the vehicle 64 can be readily moved from the platform and tracks 134 on to the tracks 122. FIG. 11 shows the position of the vehicle 64 just after it left the starting terminal 56. This FIG. 11 shows the platform 132 and the rails 134 lowered but merely for the purpose of showing the guides 138 and 140 more clearly. The guides 138 are carried by the platform 132 and the guides 140 are carried by the sidewall of the pit.

Any suitable stop means may be provided at the terminal 56. The stop being here shown comprises two posts 142 which are braced by braces 144. The posts 142 carry a horizontally extending socket 146 which receives a plunger 148. The plunger 148 carries a bumper bar 150 which is normally forced outwardly by springs 152, the springs being disposed between the posts 142 and the rear of the bumper bar. The bumper bar 150 is arranged to be engaged by the landing wheels 60 of the nose gear to thus stop the movement thereof.

The vehicle 64 may be self-propelled and be driven by any suitable type of motor. In FIGS. 12 to 15, structure is shown in which the vehicle carries an electric motor which, by a suitable gear reduction contained in housing 362, the rollers 124 are driven through bevel gears 364. The gearing is such that it will move the vehicle 64 at the same r.p.m. as the turntable.

Material saving is effected by the use of the present invention in that the turning mechanism can be characterized as the loading and unloading station, and can be arranged relatively close to the passenger terminal of the airport, since the engines of the plane need not be actuated, thus eliminating the discomfort caused by the blast of air from the propellers or the extreme heat exhausted from jet engines. The passengers, freight, etc., may be loaded and weighed at the turning mechanism and then readily turned in the proper direction and conveyed to a remote starting point, either by the cable or by the self-propelled dolly. This remote point will be sufficiently removed from the passenger terminal of the airport so as to assure that the air currents effected by the propellors or the heat and air currents of the jet engines, are not detrimental.

Too, it will be readily understood that the main landing gear need not be centered at the center of the turntable, since when all weight of the airplane is carried by the combination of the turntable and vehicle 64, i.e., when all of the main landing gear is on the turntable and the nose landing gear is on the vehicle, the desired arcuate movement can be imparted to the airplane, whenever the main landing gear is anywhere on the turntable. Thus it will be understood that airplanes of various wheel base spans between the main and nose landing gears can be turned by the mechanism, the variance in spans being only slightly less than the diameter of the turntable. Thus relatively large and small airplanes can be turned by the mechanism.

Turning radius of airplane is reduced to the minimum, thus minimizing plane's front footage space, i.e., allow more gate positions terminals for airplanes within the same area hereto found necessary.

By virtue of the present invention the turntables can be positioned relatively close to the terminal building, since those persons at the terminal building cannot be subjected to the high velocity of air currents caused by propeller type aircraft, or the intense heat ejected from the jet type of plane. By reason of the present invention, the aircraft is taxied by extraneous means to a point in the field where the airblast and jet heat is not transmitted to the persons or objects close to the terminal.

The turning of the aircraft is reduced to a minimum time because of its being handled mechanically by extraneous force other than the propelling force of the aircraft. Also, by the present system, it is possible to use permanent conveying systems for luggage or freight, as well as conveying systems for lifting the passengers from ground level to the plane; also, by virtue of the present invention, underground feeding systems may be employed for fuel oil or any of the other products that need to be conveyed to the plane, thus eliminating many of the mobile trucks that are now found necessary at the terminal. These advantages are made possible because of the fact that, by reason of the present invention, the aircraft can be positioned at an exact spot on the field.

As is previously pointed out, it is necessary only that all of the main landing gear be on the turntable, and the nose landing gear be on the vehicle at the track. In this manner the turning mechanism which is to be installed can be of the type that will accommodate the larger type jets which are now being designed in which the distance between the main landing gear and the nose gear is longer than the present type of propeller type aircraft, since the turntable is capable of receiving all of the main landing gear while the nose landing gear rides on the vehicle of the track. In this manner the airport can utilize the instant invention for the present type aircraft without going to the additional expense later on of providing larger mechanism for turning the larger jet propelled aircraft.

While the form of embodiment herein shown and described constitute a preferred form, it is to be understood that other forms may be adopted falling within the scope of the claims that follow.

I claim:

1. Mechanism for bodily turning an airplane about a vertical axis, said airplane having a pair of landing wheels and a nose wheel, said mechanism comprising in combination, a turntable of sufficient diameter for supporting the landing wheels of the airplane; a track arranged concentrically about the turntable; and a vehicle guided by the track and supporting the nose wheel; means for rotating the turntable, said turntable and vehicle supporting the entire airplane.

2. Mechanism as defined in claim 1, characterized to include means for rotating the turntable and for moving the vehicle at the same r.p.m.

3. Mechanism for bodily turning an airplane about a vertical axis, said airplane having a pair of landing wheels and a nose wheel, said mechanism comprising in combination, a turntable of sufficient diameter for supporting the landing wheels of the airplane; a track arranged concentrically about the turntable; a vehicle guided by the track and supporting the nose wheel; means for rotating the turntable; and separate means for moving the vehicle at the same r.p.m. as the turntable.

4. Mechanism for bodily turning an airplane about a vertical axis, said airplane having a pair of landing wheels and a nose wheel, said mechanism comprising in combination means forming a circular pit below ground level; a circularly disposed track in said pit; a circular platform of sufficient diameter for supporting the landing wheels and disposed substantially at ground level and carried by and movable on said track; means forming a track disposed concentric with and beyond the platform; a vehicle carried by the second mentioned track and having a platform thereon disposed substantially at ground level, said second mentioned platform supporting the nose wheel of the airplane, said turntable and vehicle supporting the entire airplane.

5. Mechanism as defined in claim 4, characterized to include means for rotating the turntable and for moving the vehicle at the same r.p.m.

6. Mechanism for bodily turning an object having a wheel for supporting the same, such as an airplane, about a vertical axis, comprising in combination, means forming a circular pit below ground level; a circularly disposed track in said pit; a circular platform for supporting a part of the object to be turned and disposed substantially at ground level and carried by and movable on said track; means forming a track disposed concentric with and beyond the platform, said second mentioned track having its highest wheel engaging portion no higher than ground level and including a vertically movable platform section; a vehicle including a wheel riding on the second mentioned track, said vehicle including a platform adapted to receive and support a part of the object to be turned; and an elevator for raising the vertically movable platform section of the second mentioned track to the ground level and for lowering the movable track section to a level at which the platform of the vehicle is at ground level when supported by the vertically movable platform section.

7. Mechanism for bodily turning an object having a wheel for supporting the same, such as an airplane, about a vertical axis, comprising in combination, means forming a circular pit below ground level; a circularly disposed track in said pit; a circular platform for supporting a part of the object to be turned and disposed substantially at ground level and carried by and movable on said track; means forming a track disposed concentric with and beyond the platform, said second mentioned track having its highest wheel engaging portion no higher than ground level and including a vertically movable platform section; a vehicle including a wheel riding on the second mentioned track, and said vehicle including a platform adapted to receive and support a part of the object to be turned; an elevator for raising the vertically movable platform section of the second mentioned track to the ground level; and for lowering the movable track section to a level at which the platform of the vehicle is at ground level when supported by the vertically movable platform section and a motor carried by the vehicle for driving the same along the second mentioned track.

References Cited in the file of this patent

UNITED STATES PATENTS

| | | |
|---|---|---|
| 517,134 | Worthen | Mar. 27, 1894 |
| 1,002,797 | Appelton et al. | Sept. 5, 1911 |
| 1,125,354 | Lovell | Jan. 19, 1915 |
| 1,287,450 | Sabin et al. | Dec. 10, 1918 |
| 1,319,833 | Bingaman | Oct. 28, 1919 |
| 1,394,489 | Funkhouser et al. | Oct. 18, 1921 |
| 1,504,558 | Hawley | Aug. 12, 1924 |
| 1,543,075 | Fornaca | June 23, 1925 |
| 1,571,732 | Norris | Feb. 2, 1926 |
| 1,883,964 | Kramer | Oct. 25, 1932 |
| 1,961,997 | Bacon | June 5, 1934 |
| 2,044,031 | Niewland | June 16, 1936 |
| 2,259,552 | Christie | Oct. 21, 1941 |
| 2,615,330 | Blackmon et al. | Oct. 28, 1952 |
| 2,735,291 | Quinn | Feb. 21, 1956 |
| 2,759,356 | Blackmon et al. | Aug. 21, 1956 |